United States Patent
Evans et al.

(10) Patent No.: US 7,130,070 B2
(45) Date of Patent: Oct. 31, 2006

(54) SYSTEM AND METHOD FOR ASYNCHRONOUS TRACKING AND QUANTIFYING OF PRINTING EVENTS

(75) Inventors: Jeremy T. Evans, Point Richmond, CA (US); Deanna S. Root, Fairfax, CA (US); Raymond G. Bradley, III, Fairfax, CA (US); Charles Louis Guerin, Morin Heights (CA); Dimytro Bazulin, Bellefeuille (CA)

(73) Assignee: Sepialine Incorporated, San Francisco, CA (US)

( * ) Notice: Subject to any disclaimer, the term of this patent is extended or adjusted under 35 U.S.C. 154(b) by 931 days.

(21) Appl. No.: 10/052,167

(22) Filed: Jan. 17, 2002

(65) Prior Publication Data

US 2002/0113995 A1 Aug. 22, 2002

Related U.S. Application Data

(60) Provisional application No. 60/262,256, filed on Jan. 17, 2001.

(51) Int. Cl.
*G06F 3/12* (2006.01)
*G06F 15/00* (2006.01)
*G06F 17/00* (2006.01)
*G07B 17/02* (2006.01)

(52) U.S. Cl. .................... 358/1.15; 358/1.16; 705/408; 715/710

(58) Field of Classification Search ............... 358/1.15, 358/1.16; 345/594; 705/400; 715/700; 719/314
See application file for complete search history.

(56) References Cited

U.S. PATENT DOCUMENTS 6,650,433 B1 * 11/2003 Keane et al. ............... 358/1.15

OTHER PUBLICATIONS

Materials from Technesis, Inc. web site <http://www.technesis.com>.
Materials from Infininty Squared Technologies Inc. web site, <http://www.printsuite.com>.
Materials from Equitrac Corporation web site, <http://www.equitrac.com>.
Materials from AEG:Technologies, Inc. web site, <http://www.aeg-tech.com>.

* cited by examiner

*Primary Examiner*—King Y. Poon
*Assistant Examiner*—Thomas J. Lett
(74) *Attorney, Agent, or Firm*—Daniel L. Dawes; Myers Dawes Andras & Sherman LLP

(57) ABSTRACT

A two-phase asynchronous print tracking system and method is described. The separation of detection of print activity and billing of print activity is accomplished by means of a quota-based message queue. Print jobs sent by a user are allowed to print without interruption until a quota number of print jobs for which no billing information has been entered are reached. When the quota is exceeded, the user may not continue until appropriate billing information is entered.

8 Claims, 2 Drawing Sheets

SYSTEM AND METHOD FOR ASYNCHRONOUS TRACKING AND QUANTIFYING OF PRINTING EVENTS

This application claims the benefit of U.S. provisional patent application No. 60/262,256, which is incorporated herein by reference.

FIELD OF THE INVENTION

The present invention relates to print job tracking on a computer network, and in particular to a system and method for asynchronous tracking and quantifying of printing events.

BACKGROUND OF THE INVENTION

In recent years, it has become increasingly desirable for businesses to quantify their printing and print media costs, both for the purpose of cost allocation and to allow them to recoup related expenses. This is of particular concern for professionals such as architects and engineers, since the services provided by such professionals may require the printing of blueprints and other large-format technical documents. The printing of such documents is costly, and thus the ability to recoup these costs through a print tracking system is of great value.

Prior to describing the attributes of existing print tracking systems, the general layout of a computer network in which such a system may be installed will be described. An office computer network generally contains each of the following elements:

1. a plurality of client computers from which print jobs originate;
2. a network through which the client computers and other system components are interconnected;
3. one or more users who generate print jobs while logged in to the computer network through a client computer;
4. print jobs, which possess inherent attributes such as quantity and page dimensions;
5. a printer, from which printed physical media is physically printed; and
6. a server computer, which is responsible for queuing and directing traffic to the printer.

In addition, many office computer networks that include print tracking also include the following additional components:

1. a component designed to detect print activity and extract relevant print job information;
2. A graphical user interface (GUI) for providing billing information (the billing dialog) to each user;
3. a central database to which data about print activity is recorded;
4. a management interface from whence the print tracking system can be controlled; and
5. a reporting interface through which print activity data can be viewed.

Any print tracking system must both detect print activity and bill print activity or, in other words, both quantify and qualify print activity. Maintaining a factual record describing all print activity on a computer network is the first requirement of a print tracking solution. This record generally includes all of the defining data for each print job that is submitted to the server. This data generally includes, but is not limited to, the name of the print server that directed the document to the printer; the name of the software application from which the print job originated; the filename of the document to be printed; the name of the computer from which the print job originated; the username of the individual who submitted the print job; the name of the printer to which the print job was sent; the number of printed pages per copy; the number of copies to be made; the height and width of the printed document; and the date and time of the print job request. This type of data is considered factual and inherent to a print job, and can be extracted automatically from a print job without user intervention.

Once reliable print activity detection has been established, it is necessary to elaborate on the resultant data records for accounting purposes. These records are factual, but lack information pertinent to accounting or "qualification." Data not inherent to a print job must be supplied by a user and then appended to an existing factual record. Such data may include, but is not limited to, the related project number; the related client number; the sub-project or phase number; the status of the project; and any additional user comments. These appended data fields allow the office administration or accounting personnel to generate invoices, cost estimates, and other business metrics to assist in the overall efficiency of the office and to allow the office to recoup what would otherwise be overhead costs.

Although the proper entry of qualification (billing-related) data is necessary in order for a print tracking system to achieve its goals, users are generally reluctant to enter such data. Users may see the process of entering such data as time-consuming or as a distraction from their immediate goals of completing a technical or professional project. Print tracking systems must therefore employ some sort of enforcement mechanism in order to ensure that users supply the qualification data in a complete and timely manner. Two enforcement methods have generally been used in existing print tracking systems.

The first enforcement method, which may be referred to as the "hostage" method, is to interrupt the print job and prevent it from completing until the user has adequately complied with the print tracking system's qualification data requirements. Thus for example a user who requests a print job may immediately be presented with a GUI (graphical user interface) in which to provide the necessary qualification data. If the user does not enter all required data, the user's print job will not be sent to the server for execution.

The second enforcement method, which may be referred to as the "quarantine" method, allows the print job to leave the client machine in an apparently normal manner. At the server, however, the print job is interrupted and placed in a holding area. A GUI at the client computer allows the user to inspect the contents of the holding area and bill the print jobs that are waiting. When the user has adequately complied with the print tracking system, the server then completes the print job. As with the enforcement method, the user's print job will not be completed until the required qualification data has been entered.

Another means by which existing print tracking systems may be distinguished is by the location at which they process data related to the print job, either at the client computer or at the server. These may be referred to as "client-side" and "server-side" (or "network-based") models. On the client-side model, the acts of extracting the factual information describing a print job and writing that information to a database occur on the client computer from which the print job originated. On the server-side model, the acts of extracting the factual information describing a print job and writing that information to a database occur on the server. It may be noted that using the client-side model, the process of extracting and writing this information must reside on each of what is typically a plurality of client computers, whereas when using the server-side model the process resides on what is typically a single server.

In a print-tracking system using the client-side model, print tracking occurs entirely at the client computer. The software installed at the client computer detects print activity and extracts its data as it leaves the client computer. The software will then initiate a billing dialog, which includes a GUI. This GUI allows the user logged in at that client computer to enter the appropriate billing information for that particular print job. A record of the print job and all of its pertinent data may then be written to a central database for later review.

One limitation of the client-side model print tracking systems is that they include no means of accounting for cases where a print job fails to complete. Since all information has been entered at the point where the print job is forwarded to the server, the client computer software will not know if problems occur during the actual printing of the job. The result may be a cost record in the central database where in fact no print job was actually completed. Where a print job is sent but fails due to a technical problem with the printer, network, or server, and that print job is later resent after the problem is corrected, the central database may contain a double entry for this print job.

Another limitation of the client-side print tracking systems is that they generally use the "hostage" enforcement model, thereby requiring the billing action to occur before the print job is sent. In order to accomplish this, the print tracking system will interrupt the print job to allow the user to enter billing information. The user cannot proceed until this information has been entered. If for any reason the user does not supply billing information about a print job, then the user's print job will not be recorded. Thus a dilemma of user enforcement with the system arises. If the print tracking system were to allow the print job to print before the user has supplied the billing information, then the user may opt not to comply with the system by entering the required information. The result would be factual discrepancies in the recorded data and missed opportunities to recoup costs associated with printing.

Still another limitation of client-side tracking is that the process of print detection is delegated to the individual client computers, which results in a limited, one-to-one tracking method. This means that by installing one instance of the print tracking program, the office has the ability to track only one user's print jobs. Two installed instances will track print jobs issuing from two client computers, and so on. Whenever new software upgrades or patches become available, they must be installed separately on every client computer.

Finally, many client-side print tracking systems are subject to problems arising from other computer applications that use non-standard printing routines. For example, on computers running the popular Windows operating system from Microsoft Corporation of Redmond, Washington, a number of Computer Aided Drafting (CAD) and other graphics applications bypass the Windows standard printing system. A client-side print tracking system cannot track printing from these nonstandard applications without the use of a "plug-in" application. A plug-in uses the Application Programming Interface (API) of the relevant software program (for example, a CAD application) to detect printing within that application, then completes the billing process in the manner previously described. If an application does not use standard printing techniques and its vendor does not offer an API, then the system will be unable to track print jobs originating from within that application. In any event, both the use of a plug-in and the development of an API increase the cost and complexity of any such print tracking system even if it can be made operable. Systems that use plug-ins, moreover, are more susceptible to changes in the various APIs of the applications they seek to track. As new versions of the APIs are released, new plug-ins must be created, tested and distributed, further increasing the cost of building and maintaining such a tracking system, and increasing system downtime as new plug-in versions are installed.

AEG:AutoTRACK, which is sold by AEG:Technologies, Inc. of Richardson, Tex., is an example of a print tracking software system that requires a plug-in for each application for which print tracking is desired. SmartPlot, another print tracking software package that is sold by Technesis, Inc. of Mountain View, Calif., has taken the client side tracking solution a bit further than AutoTrack by detecting prints on the client computer operating system. SmartPlot is, therefore, able to detect print activity on most Windows-based programs without application plug-ins. There are, however, a great many applications that do not use the native operating system print process on the client computer. As a result, a great many application-specific plug-ins must be continually developed and updated in order for SmartPlot to offer "comprehensive" print tracking. Even with these stopgap solutions, there are any number of applications that circumvent the operating system print process for which SmartPlot's developer offers no plug-in.

The network-based, or server-side, model of print tracking is an alternative approach that is implemented in some existing print tracking systems. Because a typical office has only a few print devices shared via a network, but has a multitude of client computers through which users may wish to share these resources, it is common for a user to send a print job to a printer that is physically attached to another computer. Compared to client-side print tracking, network-based print tracking offers a reliable method for detecting such print jobs and accurately recording them. In such a scenario, the onus of detection is on the server rather than the various client computers.

In the network-based print tracking process, the application plug-in of the client-side system is no longer required. Instead, the more scalable method of remote print queue monitoring may be applied. Such systems may transcend the "one-to-one" tracking ratio offered by client side tracking. This means that because the software is installed on the computer that is directly attached to the physical printer, any print jobs going to the printer will be tracked. In essence, the network-based tracking system facilitates a "one-to-many" relationship of users tracked to installed software sets.

While the network-based approach offers certain benefits over client-side print tracking, it also poses several new hurdles for the system architecture. The core design dilemma in this scenario is to first detect the print job at the server computer to which the printer is connected, then to discover the computer from which it originated, and finally to initiate the billing dialog at this originating computer. It is this last step of initiating the billing dialog that poses the most problems and in turn the widest range of attempted solutions.

All existing solutions to the problem of initiating the billing log in a network-based tracking system extract the factual information at the print server, only to relay it back to the originating machine. While the server waits for information from the user to be entered at the client computer, it must keep the print job "quarantined" to ensure that users comply with the system and supply required billing information. Thus network-based print tracking systems use the "quarantine" method of enforcement. Only after the user supplies the required billing information is the record placed into the database and the print job released to the printer. While this method is a marginal improvement over preceding client-based solutions, it still marries the act of billing a print job with the act of tracking a print job. Therefore, you will only be able to track those computers that have a current version of the required client software installed. If, for example, client computers without the necessary client billing software were to print to a monitored printer, they will be unable to free their print job from the quarantine and will thereby lock up system resources.

PrintLog Manager, which is sold by Equitrac Corporation of Coral Gables, Fla., is a popular network-based print tracking system. PrintLog Manager quarantines print jobs until users supply the proper billing information. The act of billing a print is, therefore, synonymous with the act of recording a print job. If for any reason the system fails to function, however, printing is disabled and all work must be halted. PrintSuite, which is sold by Infinity Squared Technologies, Inc. of Burnaby, British Columbia, Canada, also uses a quarantine methodology for tracking and billing prints. The server-installed component of the PrintSuite software halts print activity and prompts a user for billing information before releasing the print job to a printer.

A critical limitation of all existing print tracking systems, both client-side and server-side, is that they operate in what may be termed a "synchronous" mode. In a synchronous print tracking system, the act of writing data about a print job to a central database takes place when the print is detected and information is extracted and stored. The processes of detection of the print job and billing are thus tightly coupled together; in other words, the act of supplying billing information is also the act of placing a record in the database from the user's point of view. Such systems treat both tracking and billing as an integral part of the printing process. The desirability of decoupling the tracking and billing processes to create an "asynchronous" print tracking system, and the advantages that result from such decoupling, have gone unrecognized.

The limitations of the prior art are overcome by the present invention as described below.

BRIEF SUMMARY OF THE INVENTION

The present invention comprises a two-phase, asynchronous print tracking system. In this two-phase scheme, a print job is sent from a client computer to a server computer, where its existence is detected, and where data about the print job is extracted. The extracted data is sent to a central message queue, where the client computer reads the data and graphically notifies the user of the existence of unbilled print activity. Billed print job information is preferably written to a central location, where a management interface allows for viewing and reporting of print data.

In contrast to the "hostage" and "quarantine" enforcement methods described above, the present invention comprises what may be termed a "nag" enforcement method. This enforcement method allows the print job to pass unhindered from the client computer to the server, and then to the printer. A quota, defined by a system administrator, determines how many unbilled print jobs can exist for a given user before a mandatory billing interface is displayed. While a given user's unbilled print count is below the quota, the user may recall the billing interface at his or her discretion. The user may thus delay the entry of the required billing information to a convenient time, but cannot avoid entering the information and cannot indefinitely delay the entry of the information to a point where the user may no longer recall the pertinent information. Enforcement is preferably accomplished once the quota is reached by obscuring the computer screen with the billing interface. Though other processes on the client computer are not interrupted, the user is essentially unable to use the computer without sufficiently addressing, then dismissing, the billing interface.

Many of the advantages of the present invention flow from the separation of detection (phase 1) and billing (phase 2) of print activity, and the use of a quota-based message queue between the separate phases. The present invention allows native print processes to flow undisturbed by the requirement to enter billing information. Decoupling detection and billing eliminates the onerous enforcement techniques found in the prior art. It should be noted that in the asynchronous model of the present invention, the act of writing data about a print job to a database preferably takes place when the billing data is supplied; this contrasts with some systems in which the writing of data may or may not occur at or near the time when the print information is extracted and stored. In the asynchronous model, the moment that the factual information concerning a print job is extracted it is recorded in a message queue. The user is then prompted to supply additional billing information.

The present invention is based on the view that printing should remain a native process, and takes a "hands off the printing process" approach that makes few if any modifications to the process of printing. Thus at the core of the present invention is an intention to impose the fewest restrictions upon users while maintaining a reliable record of print events for cost allocation and recoupment.

It is thus an object of the present invention to provide an asynchronous print tracking system in which the processes of detecting and billing a print job are decoupled.

It is another object of the present invention to provide a print tracking system utilizing a "nag" enforcement method.

It is yet another object of the present invention to provide a print tracking system that reduces the restrictions placed upon users while still ensuring that all required information for print jobs will be tracked.

It is a further object of the present invention to provide a print tracking system that will properly track print jobs that are sent for printing but are not completed due to the failure of a printer, server, or the network.

It is a further object of the present invention to allow users to delay entry of billing information related to a print job for a limited period, while still requiring such information to be entered at a later time.

It is a further object of the present invention to provide a print tracking system that does not require "plug-in" software for applications that use nonstandard printing techniques.

These and other features, objects and advantages of the present invention will become better understood from a consideration of the following detailed description of the preferred embodiment and appended claims in conjunction with the drawings as described following:

DETAILED DESCRIPTION OF THE INVENTION

Figure 1:
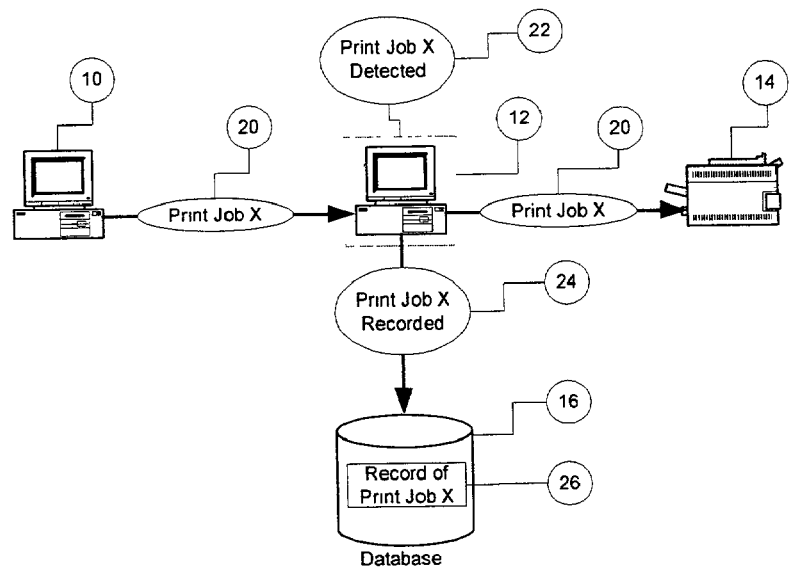
FIG. 1 is a diagram the initial steps in a preferred embodiment of the present invention.
Figure 2:
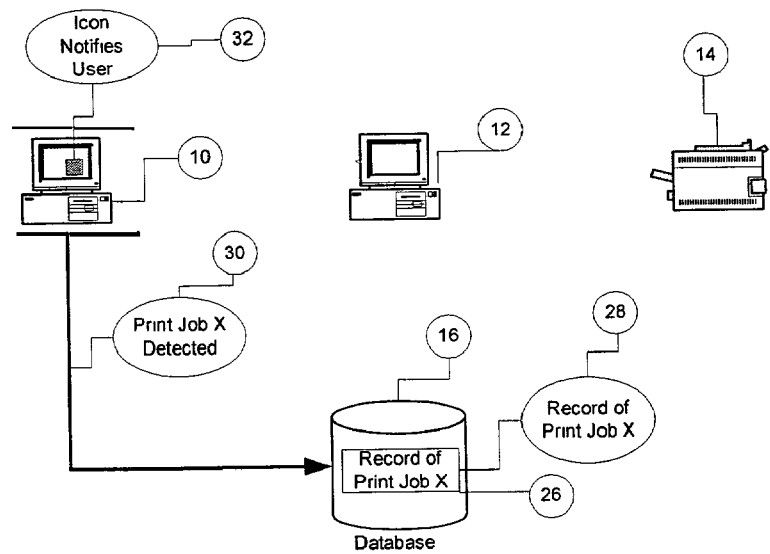
FIG. 2 is a diagram illustrating subsequent steps in a preferred embodiment of the present invention.
Figure 3:
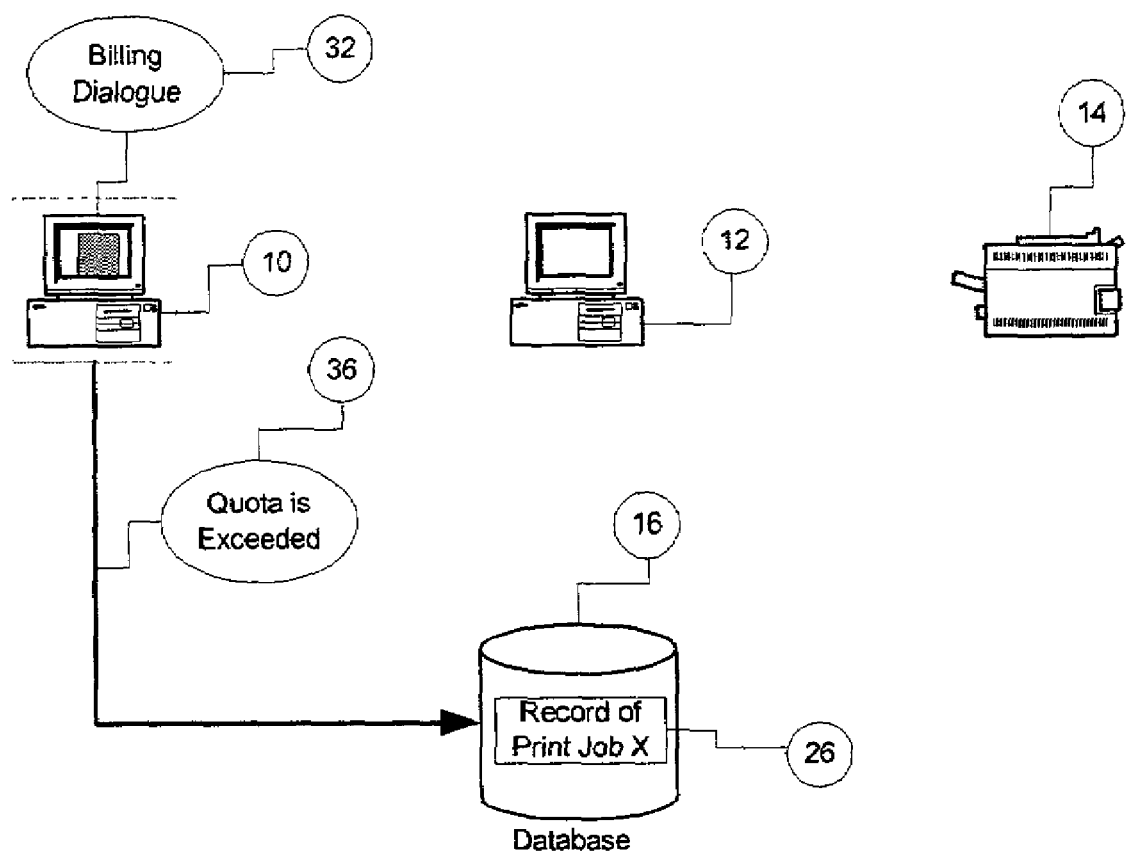
FIG. 3 is a diagram illustrating the final steps in a preferred embodiment of the present invention.

In a preferred embodiment, the invention is implemented using a client/server network as illustrated in FIGS. 1–3. The network comprises a plurality of client computers 10 that are in communication with one or more servers 12. Servers 12 are in communication with one or more printers 14. At least one of client computers 10 and servers 12 are also in communication with a database 16. Each of client computers 10, server 12, printer 14, and database 16 may be of many different configurations and designs as are well known in the art. Client computers 10, server 12, printer 14, and database 16 communicate over a network, which may be configured as a wired or wireless network as is also well known in the art. The software components of a preferred embodiment of the present invention that are resident on client computers 10 and server 12 are as follows:

1. Printer monitor: The printer monitor is a software routine that monitors print queues for printer activity. Printer monitor is preferably resident on server 12, preferably stored on magnetic disk or other permanent media, and capable of being loaded into the volatile memory of server 12 for execution.
2. Message queue: The message queue provides a place where print activity may be recorded. The message queue is preferably resident on database 16, which may comprise a magnetic disk or other permanent media.
3. Workstation monitor: The workstation monitor is a software routine that detects when new records are written to the message queue. The workstation monitor is preferably resident on client computer 10, preferably stored on magnetic disk or other permanent media and capable of being loaded into the volatile memory of client computer 10 for execution.
4. Unbilled print alert: The unbilled print alert is a software routine through which a user is alerted to the existence of unbilled print activity generated by that user, which unbilled print alert module is symbolically depicted in FIG. 3 as step 36. Preferably, the unbilled print alert places a graphical icon in an unobtrusive location on the computer screen of the client computer through which the user is logged in. The unbilled print alert is preferably resident on client computer 10, preferably stored on magnetic disk or other permanent media and capable of being loaded into the volatile memory of client computer 10 for execution.
5. Billing dialogue: The billing dialogue is a software routine that provides a graphical user interface through which the user may supply information to the record of a print job for the purpose of print job qualification, which billing dialogue module is symbolically depicted in FIG. 3 as step 32. The billing dialogue is preferably resident on client computer 10, preferably stored on magnetic disk or other permanent media and capable of being loaded into the volatile memory of client computer 10 for execution.
6. Manager's module: The manager's module is a software routine that allows network administrators to set policies related to all components of the print tracking system, and view and report on collected print activity data. The billing dialogue is preferably resident on server 12, preferably stored on magnetic disk or other permanent media and capable of being loaded into the volatile memory of server 12 for execution.

Referring again to FIGS. 1–3, the method of operation for a preferred embodiment of the present invention may now be described. A user is logged in at client computer 10. This user now desires to send a print job to printer 14. The user may execute a print job step 20 using the application software resident at client computer 10. For example, a user desiring to print a drawing from a CAD application may execute a "print" command from within that application. The result of executing the print command is the sending of the print job step 20 from client computer 10 to server 12. Server 12, which acts to manage print jobs over the network, may then send print job step 20 from server 12 to printer 14.

Printer monitor, installed at server 12, detects the print job step 20 at step 22. At step 24, printer monitor extracts relevant information from the print job step 20 issued by the user. In step 28, this information is stored in the message queue resident on database 16 in the form of print job record 26. The information now stored in record 26 will be available to other system components as required. It should be noted that the message queue is preferably capable of storing a large number of records 26 corresponding to print jobs executed by a number of different users at different client computers 10.

Workstation monitor at client computer 10 contains functionality to detect the creation of record 26 at step 30, indicating that a print job step 20 was sent by the user at client computer 10. Workstation monitor then notifies the user at client computer 10 that a print job step 20 has been sent for which qualification data must be entered. Preferably, workstation monitor does this in an unobtrusive means, such as by an icon that appears on the screen of client computer 10 at step 32.

The billing dialogue at client computer 10 may be initiated in one of two ways. First, the user may issue a command (preferably by simply clicking on the icon displayed on client computer 10 at step 32) indicating that the user wishes to enter qualification data, occurring at step 34. In this case, a GUI appears as a part of the billing dialogue that allows the user to enter the qualification data. The qualification data preferably includes the project number associated with the print job; the client number associated with the print job; the sub-project or phase number, if any; the status of the project; and any additional user comments. The information entered by the user through the billing dialogue GUI is then entered, along with the information in record 26, in a database, preferably database 16. This information will be used later by, for example, an accounting department for the user in order to properly allocate costs associated with the printing or to generate a bill for the client whose project with which the print job is associated. The information in record 26 in the message queue will be deleted upon the completion of this step so that other system components will know that the entry of qualification data for the corresponding print job step 20 is completed.

The billing dialogue may also be initiated at step 36 by the user having exceeded a predetermined limit on the number of print jobs that may be entered without the entry of qualification data associated with those print jobs. In order to ensure compliance, the billing dialogue GUI that appears when the quota is reached preferably cannot be moved and obscures other data on the screen, such that client computer 10 is essentially unusable by the user until the billing dialogue is completed. Though the screen is obscured, other processes on the computer are not stopped so that processes already running on the computer are not adversely impacted. As in the case of voluntary entry of information through the billing dialogue GUI, the successful completion of the billing dialogue results in the storage of the information entered, along with the information in record 26, in a database, preferably database 16. The information in record 26 in the message queue will again be deleted so that other system components will know that the entry of qualification data for the corresponding print job step 20 is completed.

The manager's module at server 12 may serve a number of functions in a preferred embodiment of the invention. One function is to set the predetermined limit on the number of print jobs that may be sent without the entry of qualification data which is needed at step 36 to determine if a quota has been exceeded. The manager's module at server 12 may also enable a network administrator to view and report on collected print activity across the network for all users and all client computers 10, and set other system variables related to the various components of the system.

The present invention has been described with reference to certain preferred and alternative embodiments that are intended to be exemplary only and not limiting to the full scope of the present invention as set forth in the appended claims.

What is claimed is:

1. An asynchronous print tracking system on a computer network including a plurality of client computers and a server, the asynchronous print tracking system for recouping costs for performance of a print job at a first time, comprising:
   a message queue module on the server, wherein said message queue is formatted to comprise a plurality of records, and wherein each of the records comprise data pertaining to a plurality of print jobs submitted from the plurality of client computers;
   an unbilled print alert module resident on at least one of the plurality of client computers for automatically generating a message of unbilled print cost data on the corresponding client computer when cost recoupment data is required by the server from the corresponding client computer at a later second time temporally independent from or not synchronous the first time when the print job was performed; and
   a workstation monitor module resident on the one of the plurality of client computers on which the unbilled print alert module is resident and in communication across the network with said message queue module and with said unbilled print alert module, wherein said workstation monitor module comprises means for transmitting a message to said unbilled print alert module if said message queue module contains a record pertaining to a print job submitted from the corresponding client computer.

2. The asynchronous print tracking system of claim 1, wherein said unbilled print alert module generates the message of unbilled print cost data as an icon or a textual message that appears on a computer screen associated with the client computer at the later second time.

3. The asynchronous print tracking system of claim 1, further comprising a print job monitor in communication with the client computer, wherein said print job monitor comprises means for monitoring the client computer for the submission of a print job from the client computer and to create a record pertaining to the print job submitted from the client computer.

4. The asynchronous print tracking system of claim 3, further comprising a billing dialogue module, wherein said billing dialogue module comprises means for receiving qualification data from the client computer.

5. The asynchronous print tracking system of claim 4, wherein said billing dialogue module comprises a graphical user interface.

6. The asynchronous print tracking system of claim 4, further comprising a managers module, wherein said manager's module comprises means for setting a maximum unbilled print job number.

7. The asynchronous print tracking system of claim 4, wherein said billing dialogue module further comprises means for forcing qualification data to be entered from the corresponding client computer before proceeding, when the number of records pertaining to a print job submitted by the corresponding client computer exceeds a maximum unbilled print job number.

8. The asynchronous print tracking system of claim 7, wherein the client computer includes a screen and where said billing dialogue module further comprises means for irremovably obscuring the screen of the client computer when the number of records pertaining to a print job submitted by the corresponding client computer exceeds the maximum unbilled print job number until qualification data is entered through the billing dialogue module.

* * * * *